(12) United States Patent
Peirs et al.

(10) Patent No.: US 11,356,040 B2
(45) Date of Patent: Jun. 7, 2022

(54) PIEZO ACTUATOR DEVICE AND MOTOR

(71) Applicant: XERYON, Heverlee (BE)

(72) Inventors: Jan Peirs, Oud-Heverlee (BE); Bruno Kersschot, Wilrijk (BE); Steven Cappa, Heusden-Zolder (BE)

(73) Assignee: Xeryon, Leuven (BE)

( * ) Notice: Subject to any disclaimer, the term of this patent is extended or adjusted under 35 U.S.C. 154(b) by 327 days.

(21) Appl. No.: 16/346,568

(22) PCT Filed: Nov. 2, 2017

(86) PCT No.: PCT/EP2017/078110
§ 371 (c)(1),
(2) Date: May 1, 2019

(87) PCT Pub. No.: WO2018/083205
PCT Pub. Date: May 11, 2018

(65) Prior Publication Data
US 2019/0267915 A1    Aug. 29, 2019

(30) Foreign Application Priority Data
Nov. 2, 2016   (EP) .................... 16196793

(51) Int. Cl.
*H02N 2/02*   (2006.01)
*H02N 2/00*   (2006.01)

(52) U.S. Cl.
CPC ............. *H02N 2/026* (2013.01); *H02N 2/004* (2013.01); *H02N 2/0015* (2013.01);
(Continued)

(58) Field of Classification Search
CPC .... H02N 2/026; H02N 2/0025; H02N 2/0015; H02N 2/0035; H02N 2/004; H02N 2/0055; H02N 2/0075
See application file for complete search history.

(56) References Cited

U.S. PATENT DOCUMENTS 5,345,137 A * 9/1994 Funakubo ............ H01L 41/083
310/323.16
9,791,524 B2 * 10/2017 Kwon .................... G01R 33/34
(Continued)

FOREIGN PATENT DOCUMENTS

EP   0301430 A2   2/1989
JP   2001086774 A   3/2001
(Continued)

OTHER PUBLICATIONS

Chen et al., "A Standing Wave Linear Ultrasonic Motor Operating in In-plane Expanding and Bending Modes", Review of Scientific Instruments, vol. 86, 2015, pp. 035002-1-035002-6.
(Continued)

*Primary Examiner* — Emily P Pham
(74) *Attorney, Agent, or Firm* — Workman Nydegger

(57) ABSTRACT

A piezo actuator comprises a piezo material having a first, top surface, a second, bottom surface, and a third, circumference surface. The piezo material has a polarity and the piezo material includes one or more mounting holes in the piezo material, the one or more mounting holes being positioned substantially central in at least the top surface or the bottom surface of the piezo material. The actuator also comprises at least one contact point for contacting a load to be actuated, the at least one contact point being positioned on the third, circumference, surface of the piezo material, and a set of electrodes being positioned on the top surface of the piezo material and at least one electrode being positioned at the bottom surface of the piezo material.

16 Claims, 9 Drawing Sheets

(52) U.S. Cl.
CPC ......... *H02N 2/0025* (2013.01); *H02N 2/0035* (2013.01); *H02N 2/0055* (2013.01); *H02N 2/0075* (2013.01)

(56) References Cited

U.S. PATENT DOCUMENTS

2002/0089259 A1\* 7/2002 Iino ..................... H01L 41/094
                                                           310/325
2013/0162104 A1   6/2013 Masuda et al.

FOREIGN PATENT DOCUMENTS

| JP | 2010158143 A | 7/2010 |
| JP | 2013172512 A | 9/2013 |
| WO | 2014172833 A1 | 10/2014 |

OTHER PUBLICATIONS

Extended European Search Report from corresponding EP Application No. 16196793.0, dated Apr. 27, 2017, 10 pages.
International Search Report and Written Opinion from corresponding PCT Application No. PCT/EP2017/078110, dated Jan. 4, 2018, 17 pages.

\* cited by examiner

PIEZO ACTUATOR DEVICE AND MOTOR

FIELD OF THE INVENTION

The present invention relates to an actuator, preferably for use in an ultrasonic motor. The actuator may for example be a ceramic actuator. The present invention also relates to a motor.

BACKGROUND OF THE INVENTION

Piezo actuators are often used in a multitude of applications which require a high degree of miniaturization. The biggest limitation of the typical piezo positioners however is the very small displacement. To counter this effect several principles of piezo motors have been presented which have a limitless travel range.

Three main types of piezo motors have been designed with unlimited strokes: (1) stepping motors, (2) stick-slip/inertia driven motors and (3) resonant motors. Stepping motors have a high holding force but are often too slow for many applications. Stick-slip motors achieve speeds in the order of 10 mm/s but however often cause excessive vibrations. Resonant motors, which are often called 'ultrasonic' because of the high operating frequencies, on the contrary achieve the highest speeds, in the order of 100 mm/s. This is because the piezo element(s) of resonant motors are excited with sinusoidal driving signals at a frequency which is close to two eigenfrequencies of the motor. A typical piezo motor has for instance a longitudinal and a transverse moving eigenmode which nearly coincide in frequency.

Small ultrasonic piezo motors are characterized by a high power efficiency when compared to electrical motors of the same size. Because of their compactness and efficiency, they are often used for handheld devices. Ultrasonic piezo motors are silent motors because of the high frequency operation. Another advantage of these motors is the lack of any transmission system like gears or belts. The actuation mechanism is therefore less complex and free of mechanical backlash. This means that these motors can achieve a better positioning accuracy. Even when shut down, these motors will still exert a holding force and therefore the position of the sample to be moved is fixed. Some applications also require the actuation to be back-drivable. This means that the sample can still be moved manually and that the impact of hard collisions, e.g. when hitting a hard target, can be limited. Like other piezo motors, ultrasonic piezo motors are often used in specific environments such as: in high or ultra-high vacuum, when magnetic fields are to be avoided, in cryogenic circumstances . . . . But these motors are also used for applications in atmosphere, typically when there is a need for both compactness and high speed.

Although several ultrasonic motors, operating by resonant vibration modes, have been designed over the last years, they still have some drawbacks.

Despite of the good efficiency with regard to electromotors, there is still a demand for increased efficiency of ultrasonic motors. Lower current consumption will generate less heating of the motors. Heating of ultrasonic piezo motors is very problematic because this will change the dynamic behavior, affecting the performance adversely. This will reduce the maximum duty cycle of operation, which means that the user cannot use the motor and has to wait until the motor is cooled down again. This is even more a problem in vacuum environments where convective cooling is not possible. And also for high precision positioning, it is undesirable to have large heat sources.

Typically these motors need high voltages to achieve sufficient electrical power output. It is desirable to reduce the required voltage amplitudes without affecting the mechanical power output. Lower voltage levels imply fewer and less stringent legal restrictions for mechanical systems and the drivers. The electronic drivers can be realized with less complex and lower cost components.

An important drawback is the difficulty to mount and fixate these motors reliably without influencing the behavior of the motor. The fixation is often not well determined which makes it difficult to achieve a robust motor performance. Also the way of fixation, i.e. the assembly of the motor into its suspension, is typically difficult and therefore not cost-effective.

Furthermore, the accuracy and stability of the motor is determined by the fixation method. Only with a good fixation, it becomes possible to have a better positioning accuracy and stability using piezo motors.

One of the major drawbacks of ultrasonic motors is the limited traction force and it is always a goal to achieve higher traction forces because this is required for a manifold of applications.

Also, several applications require the ultrasonic motors to be less expensive. A reduced cost price of the motor will allow the motor to be used in a wide range of new application domains.

Another important disadvantage of ultrasonic motors is the wear of the contacting materials. The operation principle is based on friction and wear is therefore inevitable. The goal is to reduce the wear as much as possible.

SUMMARY OF THE INVENTION

It is an object of the present invention to provide a good motor.

It is an advantage of embodiments of the present invention to provide a compact motor.

It is an advantage of embodiments of the present invention, that the compact motor can supply great traction force and high speed.

Furthermore, it is an advantage of embodiments of the present invention to achieve low, but very constant, speeds, high positioning accuracy (relative and absolute) and high duty cycles to a load to extend the field of possible applications of piezo motors.

It is also an advantage of embodiments of the present invention to provide a very efficient motor.

It is another advantage of embodiments of the present invention to provide a motor which can operate on low voltage levels.

It is another advantage of embodiments of the present invention to provide a cost-effective piezo motor.

It is yet another advantage of embodiments of the present invention to provide a motor which is highly reliable and highly durable.

The object and optionally one or more of the advantages are met by the system according to the independent claims of the present invention. The dependent claims relate to preferred embodiments.

The present invention relates to a piezo actuator comprising a piezo material having a first, top surface, a second, bottom surface, and a third, circumference surface, the piezo material having a polarity and the piezo material comprising one or more mounting holes in the piezo material, the one or more mounting holes being positioned substantially central in at least the top surface or the bottom surface of the piezo material. The piezo actuator also comprises at least one contact point for contacting a load to be actuated, the at least one contact point being positioned on the third, circumference, surface of the piezo material, and a set of electrodes being positioned on the top surface of the piezo material and at least one electrode being positioned at the bottom surface of the piezo material.

The examples shown illustrate the situation wherein the polarity of the piezo material is substantially uniform. Nevertheless, the polarity of the piezo material could be selected to not be uniform and to differ for example between areas underlying the different electrodes. It will be understood by the person skilled in the art that the polarity of the field applied via the electrodes may be selected differently, so as to compensate for different polarities in the different areas underlying the electrodes.

The piezo material may be a ceramic piezo material.

The electrodes may be electrically connected and configured such that, taking into account the polarity of the piezo material, the driving of the electrodes induces an in-plane bending mode and/or an in-plane expansion mode.

Where in embodiments of the present invention reference is made to an in-plane bending mode, reference is made to an oscillation mode wherein adjacent corners move in opposite sense. For a piezo actuator having a quadrangular shaped top and bottom surface, having four electrodes at the top surface and having a uniform polarization, such a mode can for example be established by generating an electric field signal with a phase difference for the two by two diametrically opposed electrodes (diametrically opposed with respect to the centrally positioned mounting holes).

A quadrangular shape may be a polygon shape having four edges/sides and 4 corners/vertices. The quadrangular shape also may be referred to as quadrilateral shape or tetragonal shape.

Where in embodiments of the present invention reference is made to an in-plane expansion mode, the different corners of the top surface move in the same direction, more particularly the radial direction. The different corners thereby move synchronously outward or inward.

The set of electrodes being positioned on the top surface of the piezo material, e.g. piezo ceramic material, may comprise at least two adjacently positioned electrodes.

The set of electrodes being positioned on the top surface of the ceramic piezo material may comprise four electrodes, the four electrodes being paired two by two and the paired electrodes being positioned diametrically opposite with respect to the one or more mounting holes.

The at least one electrode positioned at the bottom surface may be used as a reference electrode.

The piezo actuator may comprise four electrodes at the top surface and four electrodes at the bottom surface, the four electrodes at the bottom surface each covering substantially the same area as their corresponding electrode at the top surface. Corresponding electrodes may be electrically connected and configured such that corresponding electrodes are polarized inversely.

The piezo ceramic material may be substantially symmetric with respect to the one or more mounting holes.

The one or more central mounting holes may be positioned in a knot of the excited or excitable vibration modes.

The one or more mounting holes may have a non-circular cross-section.

The piezo ceramic material may comprise at least two holes as mounting holes.

The piezo ceramic material may have at least a top surface being substantially quadrangular in shape. The bottom surface also may be substantially quadrangular in shape.

The length of the sides of the top surface of the piezo ceramic material may be substantially equal.

The at least one contact point may be positioned at a corner edge of the circumference surface.

The piezo actuator may comprise two contact points being positioned at opposite corner edges of the circumference surface.

A balancing mass may be positioned in a corner edge opposite to the corner edge wherein the contact point is positioned.

The piezo actuator material may comprise a balancing mass integrated in the piezo actuator material.

The piezo actuator material may be a piezo actuator plate.

The piezo actuator plate may have an average dimension in the plane with respect to thickness ratio larger than 1, for example larger than 2 to 1.

The average dimension may be an average diameter of e.g. an inscribed circle, a length of width, etc.

The present invention also relates to a motor for actuating a load, the motor comprising a piezo actuator as described above.

The piezo actuator may be mounted using at least one mounting bar mounted in the at least one mounting hole.

In some embodiments, the at least one mounting bar may be press-fitting the at least one mounting hole, although embodiments are not limited thereto. In some other embodiments, the mounting bar is glued to the mounting hole.

The mounting bar may be obtained by a bar having at least one slit along at least part of its length as well as an insertable element in the at least one slit and pushing, when positioned in the slit, different parts of the mounting bar radially outward.

In some embodiments, no insertable element is required and the bar may have at least one slit that is spontaneously opening, e.g. due to elastic forces.

The motor may comprise a stack of piezo actuators for driving the same load, the stack of piezo actuators being stacked on top of each other.

The motor may comprise a plurality of piezo actuators for driving the same load, the plurality of piezo actuators being positioned adjacent to each other.

The motor furthermore may comprise a driver for providing driving signals to the electrodes of the actuator.

The driver and the piezo actuator material may be adapted for inducing in the piezo actuator material an in-plane bending mode and/or an in-plane expansion mode.

The present invention also relates to a system comprising a motor as described above.

The present invention further relates to the use of an actuator as described above or a motor as described above for generation of an in-plane bending mode and an in-plane expansion mode for actuating a load.

In embodiments of the present invention, both linear as well as rotating movements can be induced, thus allowing to induce a linear movement to a load as well as to induce a rotational movement to a load, depending on the application envisaged.

In embodiments of the present invention, the actuator and/or motor may be driven in a resonant way.

In embodiments of the present invention, the signals that can be applied may be periodic signals. It may be sine waves, but alternatively also may be block waves. The motor may be operated in an ultrasonic regime. The frequency used may e.g. be higher than 20 kHz.

The motor may comprise an actuator as described above, whereby furthermore a suspension is provided such that a preload is applied.

Another important advantage of embodiments of the present invention is that the dynamic frequency range of the motor shows no other parasitic modes which are close to the two excited resonance frequencies. These parasitic modes can disturb a proper operation of the motor and can consume energy.

An important characteristic of the actuator, e.g. ultrasonic actuator, of embodiments of the present invention is that the actuating mechanism generally can have small dimensions. This enables the miniaturization of the devices built around such actuators. Because of the central orifice, the mounting feature of the suspension can be made very compact. Therefore also the suspension becomes very small. This makes the complete piezo motor compact, having a lot of active material per unit of volume.

In yet another aspect the present invention relates to 2-D planar versions of a motor according to embodiments of the invention.

Embodiments of the present invention provide a combined functionality of drive and bearing of one or more of the motors according to embodiments of the invention.

Embodiments of the present invention provide the use of one or more of the piezo actuators according to embodiments of the invention, to achieve one or more DOF's of any type of instrument.

It is an advantage of embodiments of the present invention to provide a motor which can move a driven part with a large travel and high speed while maintaining a high position resolution of the driven part.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter. Further features of the present invention will become apparent from the examples and figures.

Figure 1:
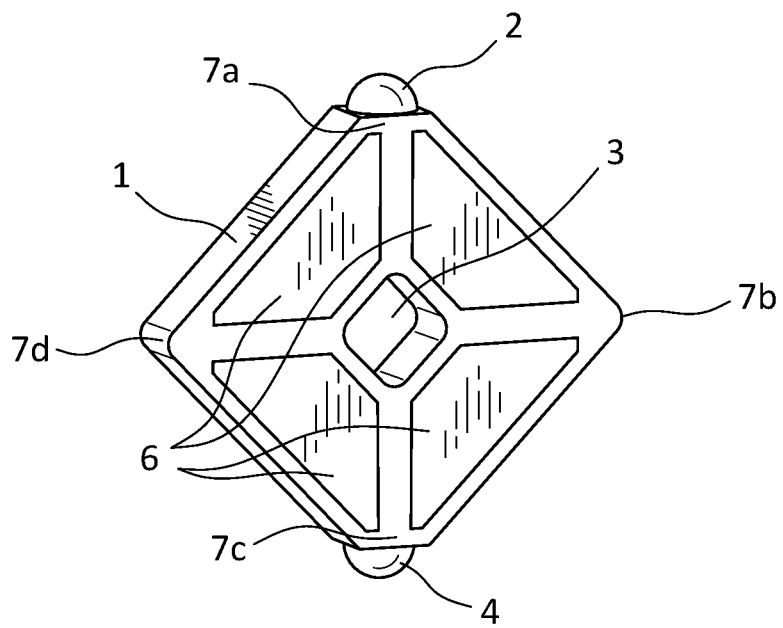
FIG. 1 schematically illustrates an actuator according to embodiments of the invention.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the drawings, like reference numerals indicate like features; and, a reference numeral appearing in more than one figure refers to the same element. The drawings and the following detailed descriptions show specific embodiments of an actuator, more particularly of a piezoelectric actuator.

Where in embodiments of the present invention reference is made to a piezoelectric material, reference is made to materials showing the effect that electric charge accumulates in response to applied mechanical stress. Inversely, by applying an electrical field to a piezoelectric material, the material will undergo a deformation resulting in a displacement.

Where in embodiments of the present invention reference is made to the circumference, reference is made to the surface at the edge of the material, not being the top surface or the bottom surface.

Where in embodiments of the present invention reference is made to an actuator, reference is made to an active element, for instance comprising piezoelectric material and electrodes, preferably in a form of a piezoceramic block or stack of different piezoceramic layers. An actuator, used in embodiments of the invention can be of any of the following types: piezoelectric, magnetostrictive, electrostrictive actuators.

Where in embodiments of the present invention reference is made to a motor, e.g. a piezo motor, reference is made to a motor comprising an actuator, for instance a piezoelectric ceramic actuator.

Where in embodiments of the invention reference is made to a suspension, reference is made to a component or mechanism that supports the motor and pushes it against the load with a force resulting in a preload.

Where in embodiments of the invention reference is made to contact, reference is made to a location where for instance a tip of a motor, according to embodiments of the invention, touches the surface of the driven object.

Where in embodiments of the invention reference is made to strip, reference is made to a part fixed to the load or stage, which makes contact with the tip(s) of at least a motor(s) according to embodiments of the invention.

Where in embodiments of the invention reference is made to tip, reference is made to a part of a motor, according to embodiments of the invention, making contact with a load. Such a tip may be a domed point, preferably a ceramic point.

Where in embodiments of the invention reference is made to preload, reference is made to a static force acting on an actuator or a motor, according to embodiments of the invention, substantially acting perpendicularly to the moving direction of the load.

Where in embodiments of the invention reference is made to load or stage, reference is made to a component or structure (to be) driven by a motor according to embodiments of the invention.

In a first aspect, the present invention relates to a piezo actuator comprising a piezo material. The piezo material may be a piezo plate, but embodiments are not limited thereto. The piezo material comprises a first, top surface, a second, bottom surface and a third circumference surface. The piezo material has a polarity. In the piezo material one or more mounting holes are provided, allowing to mount the piezo actuator. The one or more mounting holes in embodiments of the present invention are positioned substantially central in the piezo material. The piezo actuator also comprises at least one contact point for contacting the load to be actuated. The at least one contact point is being positioned on the third circumference surface of the ceramic piezo material. In embodiments of the present invention the mounting and contacting is performed at two distinct positions on the piezo material. Embodiments of the present invention furthermore comprise at least one set of electrodes being positioned on the top surface of the ceramic piezo material and at least one electrode being positioned at the bottom surface of the ceramic piezo material. The electrodes may be electrically connected and configured such that, taking into account the polarity of the ceramic piezo material, the driving of the electrodes induces an in-plane bending mode and/or an in-plane expansion mode. Further standard and optional features will be illustrated below with reference to exemplary embodiments.

In a second aspect the present invention relates to a motor comprising a piezo actuator as described in the first aspect. Where in embodiments of the present invention reference is given to a motor, reference is given to a combination of at least the actuator as described above in combination with the suspension and a preload being applied.

By way of illustration, the present invention not being limited thereto, the piezo actuator and piezo motor will further be described with reference to the drawings, illustrating standard and optional components of exemplary embodiments of the present invention. It is to be noticed that where reference is made to the motor but elements of the piezo actuator are described, reference is equally made to the actuator as such.

In FIG. 1 an exemplary embodiment of a piezo actuator is shown, wherein a piezo plate 1 is shown, with a contact tip 2, a central orifice 3, a balancing tip 4, electrodes 6 and corner points 7a, 7b, 7c and 7d.

In the particular embodiment of the actuator, e.g. piezoelectric actuator, shown in FIG. 1, the actuator is essentially symmetric front-to-back, i.e. in a first direction defined by corner points 7a and 7c (both points lying in a first symmetry plane 46), left-to-right, i.e. in a second direction defined by corner points 7b and 7d (both lying in a second symmetry plane 45). The actuator thus may have two symmetry planes perpendicular to the plane in which the actuator typically extends. The one or more mounting holes, also referred to as central fixation points, of the body is/are located in a/multiple knot(s) of the excited or excitable vibration modes. These characteristics minimize the vibrations transmitted to the machine frame, and ensure that the clamping or fixation (force) does not influence the vibration modes or their eigenfrequency. This also allows for a simple and compact fixation method, leading to a reliable and highly rigid motor. The one or more mounting holes make it easier to fix the motor. The design of the fixation is much less complex and very compact, as compared to other fixation mechanisms. Furthermore, the assembly process becomes easier and therefore the reliability of the motor improves and the assembly cost is reduced.

Because the motor is fixed rigidly in the central orifice(s), it has a higher rigidity when subjected to external forces. The position of the center point of the motor remains quasi constant. Because the central point is a knot of the excited or excitable vibration modes, there will be no vibrations passing through to the surroundings.

Piezo motors are direct-drive motors because there is no mechanical transmission between the motor and the moving part and the traction is based on a friction mechanism. Because of the central fixation of the piezo actuator, there is no need for an extra flexibility in the tangential direction, i.e. the direction of load motion, to hold or contain the actuator. Such a flexibility, for instance a mechanical spring, is typically needed to clamp the actuator or motor from both sides without adversely affecting the resonant modes. Therefore, using the central fixation, it is possible to achieve a high tangential, i.e. in the direction of actuation, stiffness of the complete actuation mechanism, which is favorable for achieving high positioning accuracies and stability. The actuator shown in FIG. 1 comprises four electrodes. This set of electrodes can be used in different modes, either sequentially or simultaneously by applying an electrical or driving signal which combines a DC signal with an AC signal for achieving the lowest tracking errors.

In the actuator shown in FIG. 1, at least one contact tip 2 is mounted on at least one of the four corner points of the ceramic actuator. To balance this mass, a small compensating or balancing mass can be added to the opposite corner point with respect to the center. The mass of this compensation point 4 and of the contact 2 determine the dynamic spectrum of the motor. By adding a balancing mass 4, the horizontal vibration mode, e.g. an in-plane bending mode, and vertical vibration mode, e.g. an in-plane expansion mode, are tuned in order to optimize the dynamic behavior which guarantees good efficiency. The improvement can be achieved through separation of the two eigenfrequencies or by making them to coincide. This balancing mass can be an integral part of the ceramic.

The drive speed and traction force of the relative motion between the stator body, e.g. module, 1 and said driven part 6 is preferably controllable by adapting the phase between and/or the amplitude(s), both individually or together, of the excitation signals of the electrodes.

The present invention also concerns an apparatus that comprises one or more of the motors based on the present invention and that is controllable to allow the simultaneous combination of these motors to position the apparatus in one or more degrees of freedom when they are working in one or more of the working modes. Such apparatus may further comprise a mobile unit, wherein the mobile unit is driven by the motor and the drive function and the bearing function may be carried out by the motors of present invention. In some particular embodiments the apparatus is operable by three or more motors, acting on the same load, which are operable in a resonant mode and are positioned within a relative angle of 120 degrees. Together these motors can be energized to move the load in one plane.

In some embodiments of the present invention, a motor is provided, preferably a piezoelectric motor, whereby the motor comprises a piezo plate with essentially four edges, all edges having essentially the same length. At least one of the corner points has a contact tip and one of the remaining corner points may incorporate a balancing mass. At least one of the two faces contains at least two electrodes.

In some preferred embodiments the shape of the active element is essentially a square, having a length over width ratio close to one. In other preferred embodiments the ceramic element has the shape of a rhombic structure, still being symmetric with respect to the central orifice along directions 45 and 46. In other embodiments, the shape is circular or elliptic or has any other arbitrary shape. Also one or more corner point(s) can be rounded or faceted for the means of production.

In preferred embodiments, the faces of the piezoelectric actuator essentially have the shape of a square.

In a preferred embodiment of the invention, only one of the two faces 5, 5' contains exactly four electrodes. The electrodes of this first face are energized two (6a and 6a') by two (6b and 6b'), symmetrically opposite to each other with respect to the center of the motor. The other face has one large electrode essentially covering the entire surface. In some other embodiments, both faces 5, 5' contain four electrodes, giving a total of eight electrodes. With four electrodes on the top face 5 and four electrodes on the bottom face 5', it is possible to double the total voltage over the four quadrants, i.e. the four segments of the piezo material, increasing the total deformation.

Figure 16:
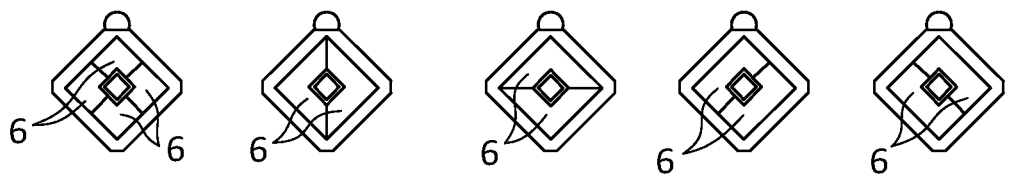
FIG. 16 illustrates different possible configurations of the electrodes, as can be used in embodiments of the present invention.

In some preferred embodiments of the invention, a set of electrodes can consist of two electrodes 6a and 6b, as illustrated in FIG. 16. In some particular embodiments, one first face 5 may consist of two electrodes, being symmetric according to a first plane of symmetry, while the second face 5', also containing two electrodes, is being symmetric according to a second but different plane of symmetry. This advantageously reduces the amount of electrodes and also the amount of electrical connections to be made. Such a combination, i.e. using different electrode sets on both faces 5, 5', can be made using different electrode patterns, whether or not being symmetric around one or more of the symmetry planes 45, 46, 47, 48. The amount of electrodes is also not limited to two or four. By way of illustration, further examples of electrode patterns that can be used are illustrated in FIG. 16, embodiments of the present invention not being limited thereto.

Figure 2:
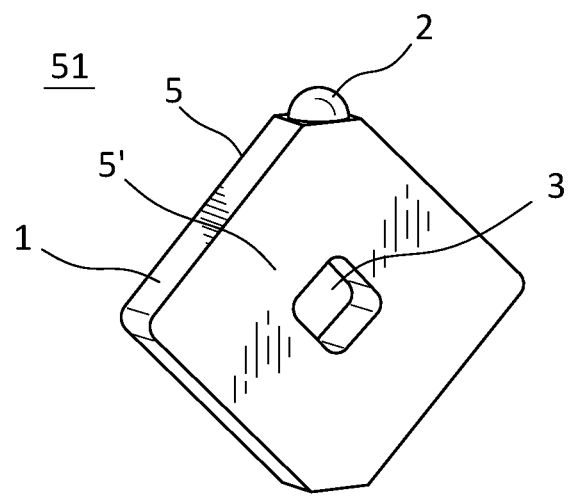
FIG. 2 illustrates a back view of a piezo actuator.

In preferred embodiments of the invention an actuator may be fixed in the center to the environment through at least one mounting feature, e.g. a mounting hole 3, as illustrated in FIG. 1 and FIG. 2. Some preferred embodiments comprise a mounting orifice 3, e.g. having a hole with a square cross-section, located at a node of the vibration modes used to drive this motor. In other embodiments, the orifice has a circular shape or any other type of shape. In the preferred embodiment the central orifice has a squared-like shape with the corners of the orifice being rounded for production purposes and to avoid the formation of cracks.

The size and shape of the central orifice(s) can be adjusted to obtain the desired frequency response of the actuator. The size of the orifice can be varied to improve the dynamic behavior of the actuator, bringing the eigenfrequencies closer to each other. In other embodiments the central orifice has a different shape, like a circle, a rhombic shape, a triangle or another shape. In yet other embodiments, the orifice comprises additional features, for instance slots, a thread, or inserts having such features, to improve the fastening of the actuator.

Figure 13:
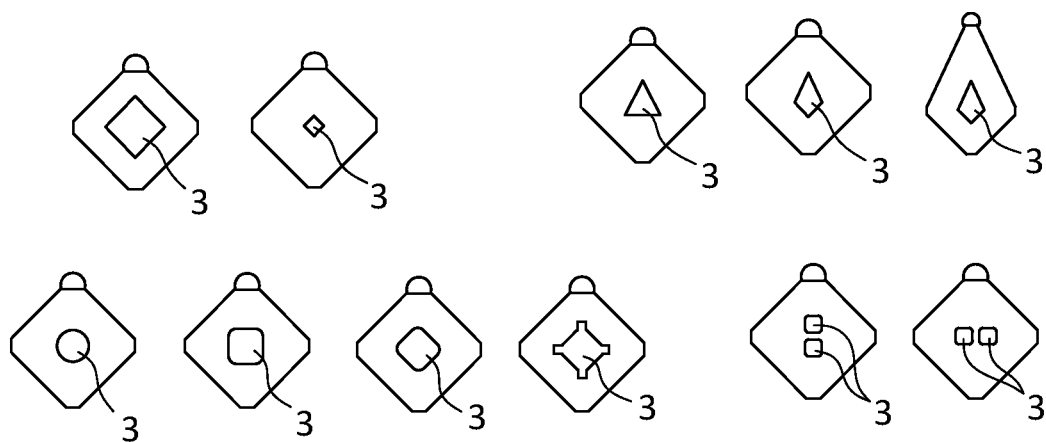
FIG. 13 illustrates different shapes, size and number of a substantially central orifice(s), as can be used in embodiments according to the present invention.

By way of illustration, further examples of mounting orifices that can be used are illustrated in FIG. 13, embodiments of the present invention not being limited thereto.

In preferred embodiments of the piezo motor the ceramic actuator is mounted over a mounting rod, e.g. a central pillar, 71 having a cross-sectional shape corresponding to the mounting feature 3, as shown in FIG. 2. Assembly is performed by inserting the mounting rod 71 into the orifice 3. In some preferred embodiments, the motor is fixed through application of a central bolt which tightens the mounting pillar 71 into the orifice 3. The motor performance shows a high consistency upon fixation with this method, leading to a robust and reliable motor. In other embodiments both elements are fixed through the application of a type of glue. The mounting pillar 71 may incorporate extra features, such as one or more flexible elements to tighten it into the orifice 3.

Figure 3A:
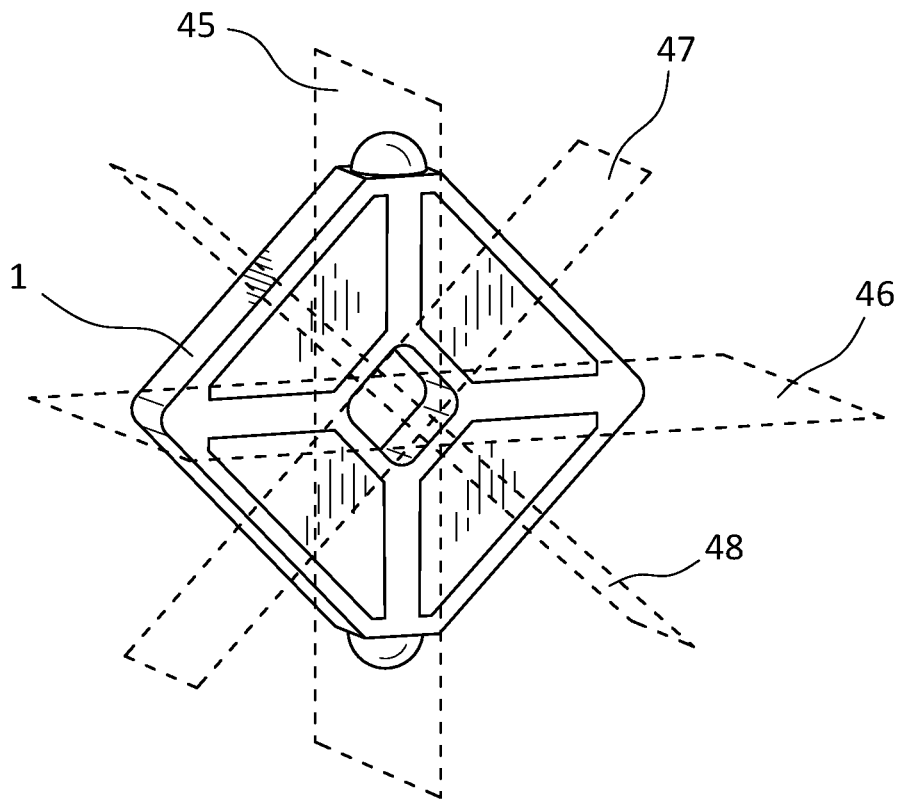
FIG. 3a to FIG. 3d illustrate different symmetry planes and lines in a piezo actuator according to an embodiment of the present invention.
Figure 3B:
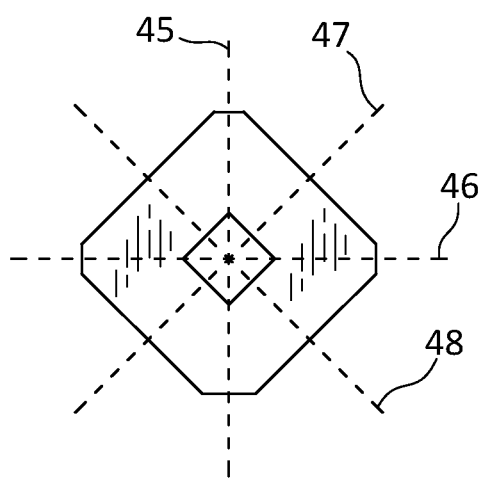
Figure 3C:
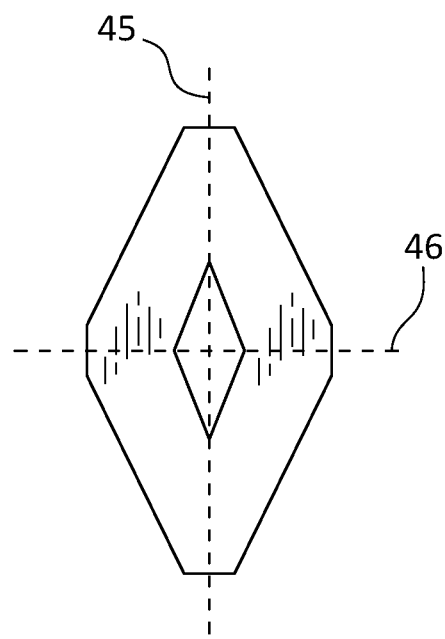
Figure 3D:
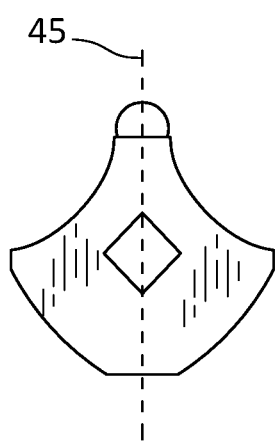

The design of the motor essentially may have a high degree of symmetry around the fixation point. In some designs, the piezo material and/or the actuator has/have at least one straight line of symmetry. In other designs, the piezo material and/or the actuator lay-out show(s) two straight lines of symmetry 45, 46 having a crossing point in the center orifice. In the most favorable design, there are four lines of symmetry 45, 46, 47, 48 (symmetry lines 47, 48 being symmetry lines for the piezo material and for the actuator except for the contacting points) which pass through the center point(s) of the piezo material and/or of the actuator which is also the center of the orifice, as shown in FIG. 3a. Alternatively, less lines of symmetry may be present in the design, as can be seen in the materials and/or actuators shown in FIG. 3c and FIG. 3d.

In preferred embodiments an actuator, e.g. piezoelectric actuator, is provided with a symmetric geometry, with ends vibrating in opposite directions, keeping the fixation point to the suspension steady.

The piezo material is essentially symmetric in the thickness direction and with respect to the center, without consideration of the possibility of having asymmetric electrode patterns.

A first advantage of the highly symmetric design is that it is easy to tune the motor to have the desired dynamic behavior. A small balancing mass can be added to the motor to slightly change the eigenfrequencies and/or to compensate for the mass of the contact point. In general an increased mass will lead to a lower eigenfrequency, but the influence on the different eigenmodes is not equal. One of the resonance modes experiences a larger effect than the other, e.g. installing a mass at one of the end points of the ceramic will have a larger influence on the tangential mode because the tip motion is much larger as compared to the normal mode. Therefore, by adding/removing one or more mass(es) at one or more of the corner point(s), it is possible to tune the design of the motor experimentally to have an optimal performance. In the final design of the motor, such a counterbalance mass may be incorporated into the piezo ceramic itself, extending the position of one or more corner point(s) slightly, but reducing the effort for the full assembly of the piezo motor.

A motor, e.g. piezoelectric motor, according to embodiments of the invention is preferably designed such that a contact zone, provided by e.g. a point 2, is able to produce a closed trajectory, thereby inducing a relative motion of the driven part 13a, 13b with respect to the motor. The contact zone, provided by a e.g. point 2, is preferably moved by applying an electric signal or field to the at least two electrode groups 6a and 6b. The motor acts against an element, such as for instance a strip, or another shape like for instance a ring or arc, to generate a relative motion between both. In preferred embodiments the material of this part, e.g. a point, is preferably a wear-resistant ceramic.

Contact zones, e.g. points, 2 comprise in preferred embodiments a convex and spherical surface as this works against a wide variety of driven surfaces, for instance planar, cylindrical or sections thereof, and relaxes alignment tolerances of the motor with respect to the driven surface. The contacts can also be planar, cylindrical, or with single or double curvature or any other arbitrary shape. These tips can be made of any type of material; preferably said tip is a ceramic tip. The tip can also be an integral part of the actuator. It is also possible to use multiple contact points per actuator.

Figure 14:
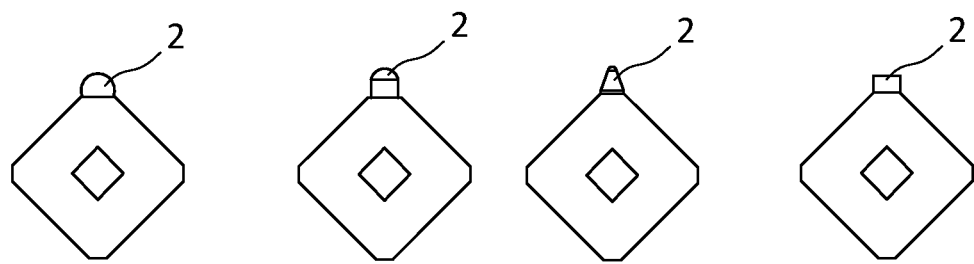
FIG. 14 illustrates different possible shapes of the contact point, as can be used in embodiments of the present invention.

Varying the shape of a contact will not necessarily have a large effect on the resonance modes as long as the mass remains unchanged. Typically the tip has a very large radius at the contact zone. The top surface of the contact point is preferably a domed surface, having a very large local contact radius to reduce the Hertzian tension in the contact zone. The tip may be cylindrical with a domed top surface. The contact tip can also have a conical shape or it may have a prismatic shape having a chamfered or rounded edge. For both the contact materials, i.e. the strip and the tip, it is preferable to use a wear resistant type of material and typically a ceramic material is used. A balancing mass does not necessarily need to be of a ceramic material and the shape is less important. Both the contact point(s) and the balancing point(s) can be attached to the actuator through the application of glue or other fastening techniques, like mechanical clamping, fitting, soldering or brazing, or can be an integral part of the piezo ceramic. Examples of different contact points/zones are given in FIG. 14.

Double-Sided Operation and Multiple Contacts

Figure 11:
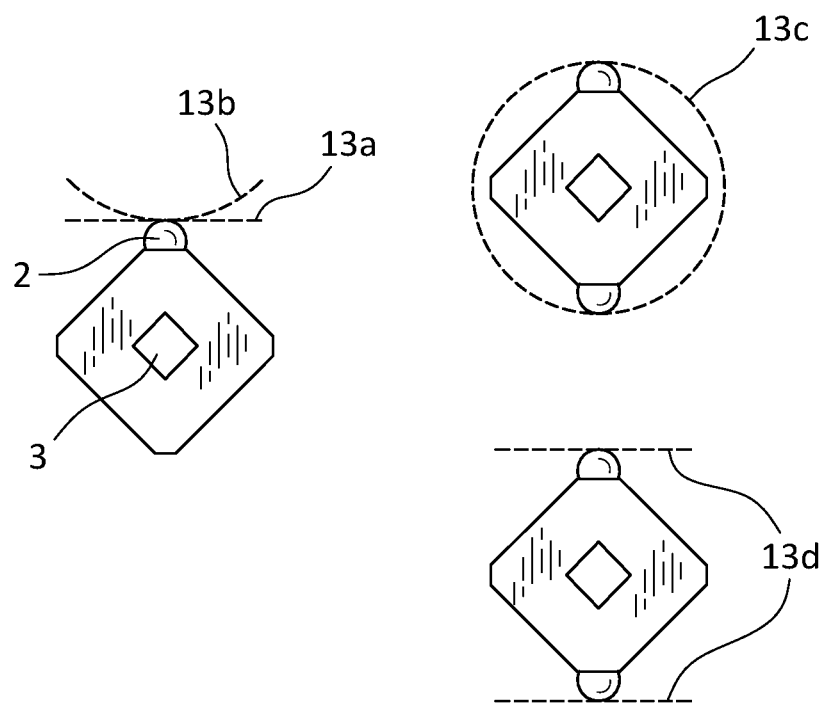
FIG. 11 illustrates different types of motion trajectories that can be induced according to embodiments of the present invention.

Instead of having one contact zone, e.g. point, 2 only, in one preferred embodiment the piezo motor can be equipped with two contact points 2a and 2b, one on each side of the motor, as illustrated in FIG. 11. For the preferred resonance modes, the contact points follow their trajectory in the same direction: when contact point 2a moves in a clockwise direction, then contact point 2b will move in the same clockwise direction.

The contact point can be placed at a large distance from the fixation point, creating a large 'swinging' arm. The longer the arm, the larger becomes the amplitude of motion. The length/width ratio can be increased to enhance the 'swinging' or 'levering' effect.

The distance of the contact zone to the center of the actuator does have an impact on the tip motion because an increase in distance will introduce a larger levering effect. This distance can be enlarged by using a longer contact point or by extending at least two of the corner points of the actuator, resulting in either an actuator with a larger overall surface or a motor having a more rhombic shape. Having a larger levering effect will lead to a larger effect of the tangential mode, for instance resulting in a higher maximum speed and also to a stronger stretching motion of the expansion mode, for instance resulting in a larger traction force.

In other favorable embodiments the piezoceramic actuator has a larger lever arm at the position of the contact tip to increase the motion of this corner tip, while at the opposite corner the lever is reduced and broadened to keep the masses balanced. This layout advantageously increases the motion of the tip, and therefore the performance of the motor, while limiting the total height of the actuator and therefore the overall footprint of the motor.

In other embodiments, one of the lever arms of the piezoceramic can also have a more conical shape, like the shape of a horn, to enhance the motion of the contact point.

Figure 12:
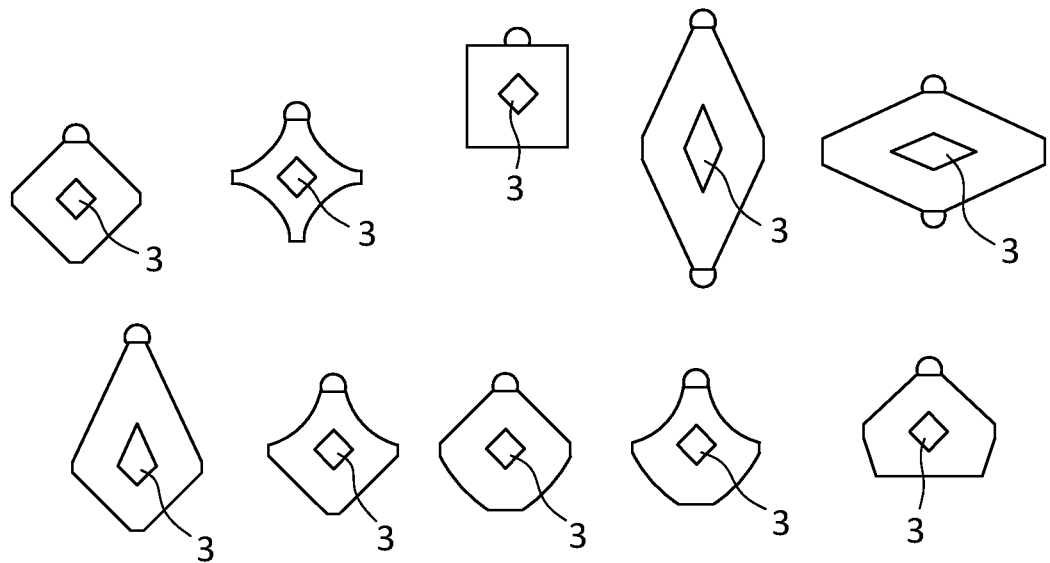
FIG. 12 illustrates different shapes of the piezo electric material, as can be used in embodiments according to the present invention.

Examples of the shape of the actuator are shown in FIG. 12.

Figure 9:
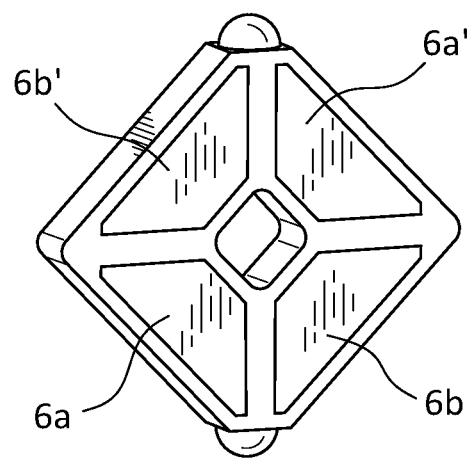
FIG. 9 illustrates a specific configuration of electrodes in a piezo actuator according to an embodiment of the present invention.
Figure 10:
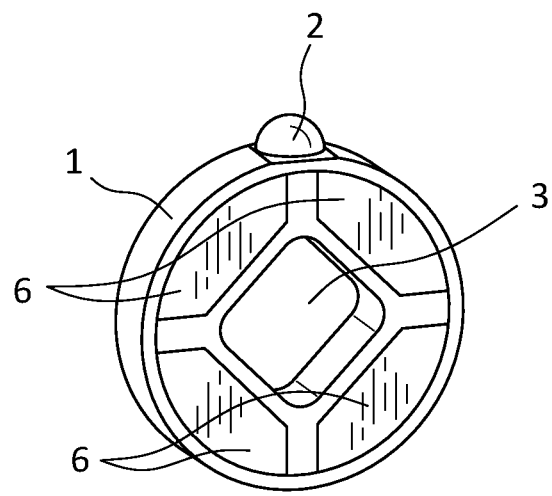
FIG. 10 illustrates another piezo actuator according to an embodiment of the present invention

In one of the preferred embodiments of the presented invention one or more face(s) of the actuator, e.g. the piezo electric actuator, essentially has (have) the shape of a square, as shown in FIG. 9. In an alternative embodiment the contact point is not positioned at one of the corner points but instead in between two corner points. FIG. 10 shows another embodiment of the invention, with a piezo ceramic having a circular shape. In other embodiments of the invention, the face(s) of the actuator has (have) a rhombic shape, as an example of an embodiment with essentially two symmetry lines, either with a height over width ratio larger than one, or inversely smaller than one. In yet other embodiments, the edges in between corner points may have a conical shape, some with a concave curvature like for instance the shape of a horn, which advantageously increases the levering motion of the contact point. Other embodiments also show a curved edge in between corner points, but with a convex curvature, for instance with the purpose to increase the balancing mass while still being compact.

In most embodiments the corner points are chamfered and/or rounded to avoid the existence, generation and/or growth of cracks as much as possible. For similar reasons, the edges of the piezo material may be slightly faceted. Further examples of particular piezo ceramic plates that can be used are given in FIG. 12.

It is an advantage of embodiments of the present invention to provide a motor which is designed to comprise a large amount of active material, for instance piezomaterials, per volume to obtain high power outputs and long strokes of amplitude motion. In one particular embodiment, the presented motor can achieve speeds up to 600 mm/s and forces up to 2N at voltage levels of only 20 Volts peak to peak. This is advantageous for highly dynamic positioning purposes. Moreover, by using a motor according to embodiments of the invention, an improved combination of velocity, accuracy and driving force is possible.

In one of the preferred embodiments the driving frequency of the presented invention lies in between 100 and 200 kHz, which can vary depending on the size of the motor. For an actuator with a thickness of 2 mm, and a square shape having edges of about 10 mm long, a good driving frequency lies in between 160 and 180 kHz.

It is an advantage of embodiments of the present invention to provide a fast nanometer positioning system, which is able to combine the high speed capability of an ultrasonic piezo motor with the fine positioning capability because of a highly stable suspension and phase control. This motor has the capability of achieving a speed of at least 100 mm/s, low stable speeds down to several nanometers per second, and a positioning accuracy or resolution of at least 5 nm, by only using the resonant operation mode.

In preferred embodiments the resonant mode is achieved by exciting or energizing the two electrode pairs by two AC voltages with varying phase difference between the two AC voltages and/or varying voltage amplitude(s). These voltages excite the horizontal eigenmode, e.g. an in-plane bending mode, and vertical eigenmode, e.g. an in-plane expansion mode, of the actuator, resulting in an elliptical motion of the contact zone. The phase control may consume a little more power than compared to the amplitude control, but it leads to an almost deadzone free response. To benefit from both control strategies, preferably a constant low voltage amplitude and phase control are implemented for low velocity and an amplitude control with a phase of 90 or −90 degrees is preferably applied when higher velocity is desired. Using this technique, the motor consumes a very small amount of power while being able to actuate at high speed and high precision, experiencing a negligible effect of deadzone. In preferred embodiments, in order to get a good control performance, the identified velocity response for a variable phase input is preferably linearized.

The drive speed of the relative motion between the stator body and a driven part is controllable by varying the phase and/or the amplitude of the electrical signal applied to at least two electrodes.

In preferred embodiments of the invention, excitation of the at least two electrodes of the motor is adaptable to control the thrust force of the relative motion between the body and the driven part.

In preferred embodiments an actuator, e.g. piezo actuator, is provided which advantageously can combine high speed and high accuracy by combining resonant and direct operation modes. Preferably combining high speed and low tracking error is enabled by applying resonant, using high-frequency drive signals, and direct, using quasi-static signals, operation modes simultaneously by combining the corresponding signals into a single electrical signal applied to one or more electrodes. Similarly, it is possible to energize one or more electrode(s) using high-frequency signals, while energizing one or more other electrode(s) using quasi-static signals.

The electrical connections to the electrode(s) can be realized using a flexprint or by soldering wires. It is also possible to use spring-loaded contacts in environments where plastics and soldering materials cannot be used, such as Ultra-High Vacuum.

In preferred embodiments a motor, e.g. piezo motor, is provided which can operate simultaneously or sequentially in one or more of the following working modes: resonant mode and direct mode. It is an advantage of embodiments of the invention that a seamless transition between sequentially operated modes can be provided by combining driving signals of different modes.

In preferred embodiments the actuator is squeezed all over its face through electrically energizing the electrodes, in order to expand the element in the radial direction $12a$, $12b$, $12c$, $12d$. This creates a normal movement $12a$, $12c$ of a tip. By alternately energizing left and right electrode groups $6a$ and $6b$, or $6a'$ and $6b'$, or $6a$, $6a'$ and $6b$, $6b'$, the motor is squeezed at one or more side(s) while being uncompressed at one or more other side(s). This leads to a tangential in-plane bending motion 8, 9, 10, 11 of the corners of the actuator, which includes the tangential in-plane bending motion 8 of the tip. The tip motions can be combined (superimposed) by superimposing the corresponding driving voltages.

Figure 4:
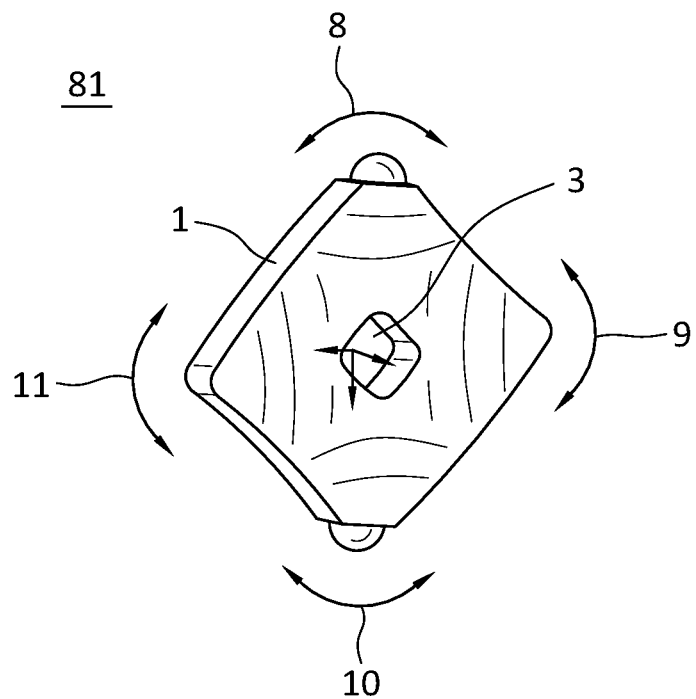
FIG. 4 and FIG. 5 show different resonant modes of a piezo actuator according to an embodiment of the present invention.
Figure 5:
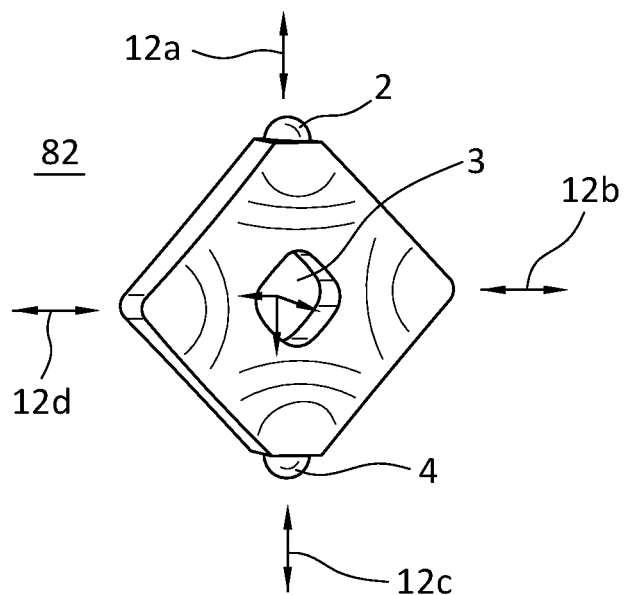
Figure 6:
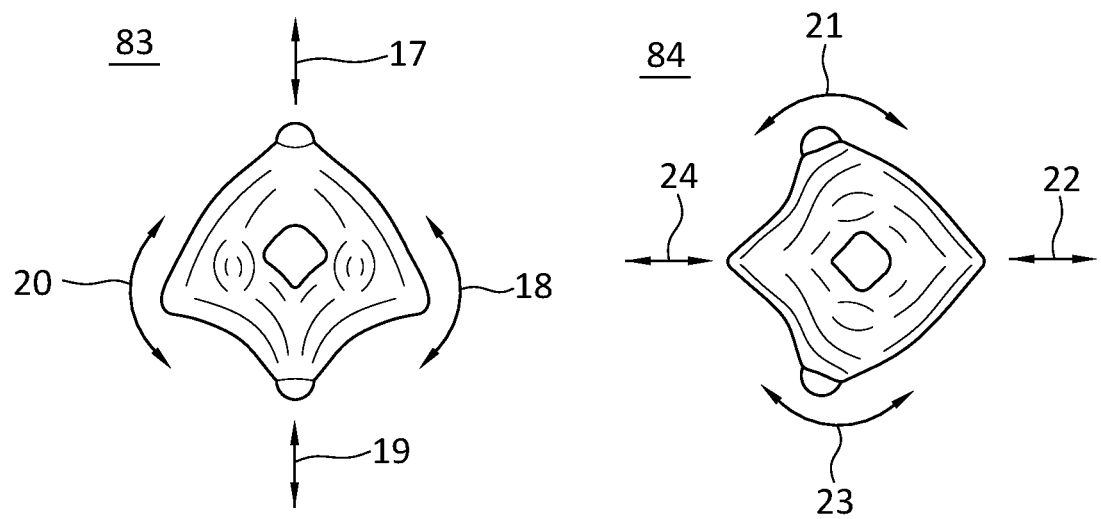
FIG. 6 illustrates further resonant modes of a piezo actuator according to an embodiment of the present invention.

The ceramic actuator essentially has four major resonance modes. In preferred piezo motor embodiments, the two resonance modes which are used are a radial expansion mode with corner tip motions $12a, b, c, d$ and a tangential in-plane bending mode with corner point motions 8, 9, 10, 11, as shown in FIGS. 4 and 5 In other embodiments of the motor, two other resonance modes may be used: one having a normal motion 17 of the contact tip 2 with corner point motions 17, 18, 19, 20 and one having a tangential motion 21 of the contact tip 2 with corner point movements 21, 22, 23, 24, as shown in FIG. 6.

In most of the embodiments, the actuator and the used resonance modes show a high level of symmetry. The central mounting orifice 3 remains at its place while the different corner points are moving due to voltage excitation. Both the expansion, i.e. normal, mode with corner tip movements 12 $a, b, c, d$, together with the bending, i.e. tangential, mode, are well-balanced. In the radial mode all opposing corners will be moving symmetrically with respect to the center, i.e. $12a$ as opposed to $12c$, and $12b$ compared to $12d$. In the tangential bending mode also the opposing corner tips of the actuator will move in the opposite direction with respect to each other. In this way each corner tip motion will be balanced, or compensated, by the tip motion of the opposite corner tip, leaving the center point at its position. The central point is not moving and the mounting feature is essentially standing still because the central point is a knot of the vibration modes, making the motor dynamics much less sensitive when mounting it. Additionally, there will be no vibrations passing through to the environment.

In some tangential, e.g. bending, resonance modes of the actuator the movements of the opposite corner points move in the opposite direction with respect to each other, making it possible to realize a rotation of a rotational slider with more than one corner point driving the slider, for instance the contact tip and an opposing side tip also having a contact tip. This will increase the torque of the drive. Likewise, in other resonance modes the movements of the opposing corner points are in the same direction, making it possible to realize a linear movement of the slider with more than one corner point driving the slider, for instance both the contact tip and an opposing side tip. This will increase the traction force of the drive.

In preferred embodiments the points in the middle of the corner points and along the edges are only subjected to a radial deformation due to the radial expansion mode 82 and show no movement in the tangential in-plane bending mode 81. In some alternative embodiments, these points are used to attach extra stiffening features or to fix the actuator. These stiffening features, e.g. one or more small leaf spring(s), must be flexible in the radial direction to allow for this deformation, i.e. the in-plane expansion and contraction and must remain stiff in the other directions. This is beneficial to increase the total stiffness of the suspension of the piezo motor, resulting in a higher positioning accuracy and stability.

An actuator according to embodiments of the invention, can be easily scaled without hampering the operating principle of the motor, as well for the resonant mode as for any other operating modes. In some embodiments, the actuator is enlarged to increase the traction force. In other embodiments, the size of the actuator is reduced to realize a smaller sized motor. When all of the actuator dimensions are enlarged with a factor, the resonance frequency will drop with the same factor, or vice versa, the resonance frequency will rise when reducing the dimensions of the actuator.

In preferred embodiments, the function and performance of the actuator is not very sensitive to variations in the thickness of the piezo ceramic. This robust design reduces the need to set tight tolerances on the thickness of the piezo plate and the dynamics of the motor are hardly affected by the thickness.

In embodiments of the present invention, the piezo material may be in the shape of a plate, although embodiments of the present invention are not limited thereto. If the piezo material is a piezo plate, the ratio of a typical dimension in plane with respect to the thickness may be larger than 1, e.g. larger than 2/1, e.g. larger than 3/1, e.g. larger than 5/1.

In some preferred embodiments, the thickness of the piezo plate of the actuator can be reduced without affecting the mechanical performance of the motor. This advantageously decreases the size of the motor which can comprise several actuators in parallel, leading to an increased traction force and/or a decreased wear for the actuator tips.

Figure 8:
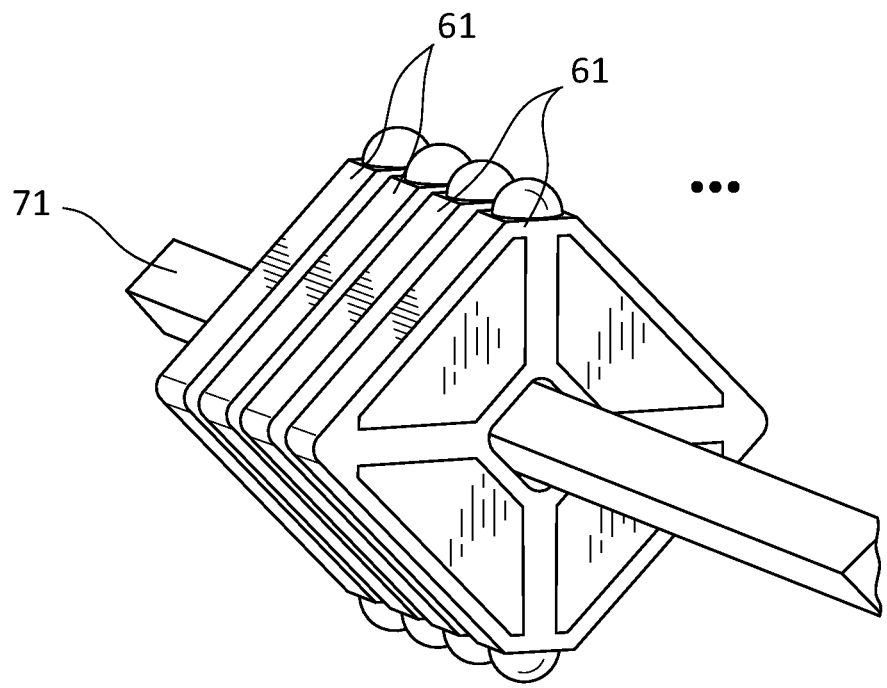
FIG. 8 shows a stack of piezo actuators, as can be used in an embodiment of the present invention.

The ceramic piezomaterial of some preferred embodiments of the invention exists of a stacked type of piezomaterial, e.g. PZT or PVDF, to increase the induced motion. For these embodiments, the required voltage amplitudes remain low as compared to non-stacked materials, without affecting the mechanical power output. This reduces the complexity of the electrical drivers, not needing a high level DC voltage source or a high amplification DC to DC voltage converter, and lower voltage levels imply less stringent legal restrictions for mechanical systems and drivers. An example of a stacked set of piezo plates is shown in FIG. 8.

A single motor can consist of several ceramic actuators, which are for instance stacked on top of each other, to increase the traction force. In other embodiments, several motors, whether or not containing multiple piezoelectric actuators, can be placed next to each other to operate in parallel. Another advantage of using multiple motors and/or multiple actuators in parallel, is the reduction of wear of the contacting materials, i.e. contact point 2 and ceramic ruler 102, because the overall required traction force can be achieved by using a lower individual preload.

In some preferred embodiments, the piezoceramic element is very thin. The performance of the actuator is to a large extent insensitive to the thickness of the piezoceramic and therefore it is possible to stack several thin actuators together to obtain a large traction force for a small volume, also with the possibility to reduce the wear of the contact tip 2.

In embodiments where a piezoelectric element is used as an actuator or as an actuating means, said piezoelectric element may be a piezoelectric stack or a multi-layered piezo element. Such a piezoelectric stack can comprise at least two piezoactuators placed in series, while electrically being connected in parallel. In further embodiments at least one non-active layer may be introduced in between the at least two piezoactuators, for instance an electrode or an insulating layer. The multi-layered piezoelectric stack advantageously provides a multi-layered actuator. In embodiments whereby an actuator comprises more than one piezo material, e.g. a multi-layered stack, said layers or sections of the actuator may be excited separately by applying individual signals, to enable the different operation modes of the actuator, to different sections of for instance a multi-layered stack.

The advantage of using multi-layered material is that the voltage levels required to achieve the same degree of deformation are lower.

The dynamics of the motor are (to some extent) independent of the thickness of the piezo element, because the resonance frequency will not change significantly. Thinner piezo plates are subjected to a larger electrical field when applying the same voltage difference over the plates, which will produce a larger deformation. The larger mechanical deformation results in an increase in mechanical output, i.e. speed and/or traction force, for a given voltage amplitude. Therefore, it is advantageous to use very thin actuators, also because more of these plates can be stacked together in the same volume, resulting in higher overall traction forces and/or reduced wear of the individual tips. However there is a limit to this benefit, as for smaller plate thicknesses the parasitic modes will shift to lower frequencies, coming closer to the working resonance modes. Also, the piezoceramic plates will be more fragile, especially when subjected to mechanical vibrations and shocks. Therefore, thinner piezo plates can be energized with lower voltage levels to achieve the same deformation.

The negligible influence of the plate thickness on performance is also favorable regarding cost, because the motor can be produced starting from cheaper standard plates of piezoceramic material.

By putting several (thin) actuators in parallel, the required preload of the individual actuators can be reduced while still achieving a desired traction force. A small preload of each individual actuator against the slider is advantageous to reduce the wear of the frictional contact. Because of the compact mounting rod, it is possible to achieve a large traction force, with several actuators working in parallel, in a relatively small volume of space, and/or also with a limited amount of wear.

This is also important because the need for high efficiencies leads to choosing piezomaterials with high Q-factors, having very steep and tight resonance peaks. Having the need for less stringent tolerances on the piezo material, the final motors will be more robust and fewer quality checks will need to be performed to ensure a good operation of produced piezo motors.

In preferred embodiments the at least two materials, e.g. piezo actuators, are combined in a single package to increase force and power output, with their driving tips oriented to actuate the same body. This package preferably provides a common suspension for the actuators. In other preferred embodiments the two or more actuators, e.g. piezo actuators, can be stacked in a single package to increase force and power output, with their driving tips oriented to actuate the same body. This package advantageously may provide individual suspension for each actuator.

In another aspect the present invention relates to any stack of actuators or motors, e.g. piezo motors, or already stacked actuators (e.g. a stack of stacks), comprising an actuator according to the present invention.

In preferred embodiments a motor, e.g. piezo motor, is provided where both ends are equipped with driving points. This motor is preferably designed in a way that the driving points generate motion in the same direction but opposite sense.

Figure 7:
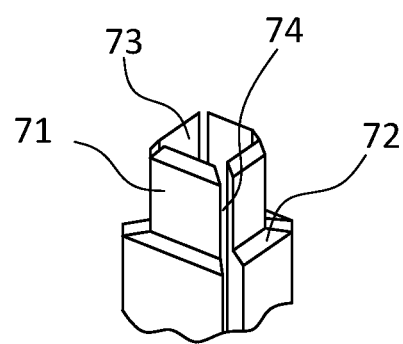
FIG. 7 shows an exemplary mounting pillar for mounting an actuator according to an embodiment of the present invention.

A single mounting pillar can incorporate one or more flexible feature(s) acting as mechanical spring(s) to preload one or more actuator(s) individually against the slider. In the case of multiple actuators being attached to one mounting feature, in between different actuators a spacer can be placed, which can also be an integral feature of the pillar, as to provide the possibility of a relative motion of each individual unit and to have some space for the electrical connections to the electrodes. A mounting feature, e.g. a rod, may also contain one or more clamping features to fix one or more piezoceramic elements more rigidly. An example of a mounting pillar is shown in FIG. 7. The mounting pillar illustrates an end portion 71, a shoulder 72, a slit 74 and a receiving opening 73 for receiving a receivable element.

According to some embodiments, several piezoactuators can thus be placed on top of and/or next to each other to increase the force output, i.e. the traction force and the holding force. The individual actuators can be either fixed on a single central fixation part, or each having its own fixation feature, or through a combination of both. With a single fixation pillar the individual actuators can be packed very closely to each other, but this requires a good alignment of all the individual contact tips with respect to the ceramic ruler. This alignment can also be achieved by performing a machining, for instance grinding, step on all of the contact tips, after assembling all of the individual actuators. An alternative strategy is to use one single large contact tip which is connected or fixed to all of the individual piezo elements.

In preferred embodiments of the ultrasonic actuator, the plate exists of a piezoelectric ceramic material with a high quality factor (sometimes called 'hard piezoelectric material'), having an increased amplitude of motion at the eigenfrequencies of the actuator and reducing the energy losses when converting electrical energy into mechanical energy. Using material with high Q-factors also has a drawback because the resonance peaks cover a much narrower range of frequencies, characterized by very steep changes in amplitude response, sudden phase changes and high amplitude peaks, making the operation of the motor more sensitive to changes in motor dynamics. In some embodiments, the Q factor of the material may be 100 or higher, e.g. 500 or higher. The advantage of several of the embodiments of the current invention is that the dynamics will hardly be affected by the plate thickness and by the method of fixation.

The reduced energy losses will lead to less heat generation and the dynamics of the actuator will be less affected by temperature changes and the motor will be able to operate for longer time at high duty cycles and will achieve higher duty cycles. Also the positioning stability and absolute positioning accuracy of a load will improve, because a reduced heat source leads to thermal deformations.

Figure 15:
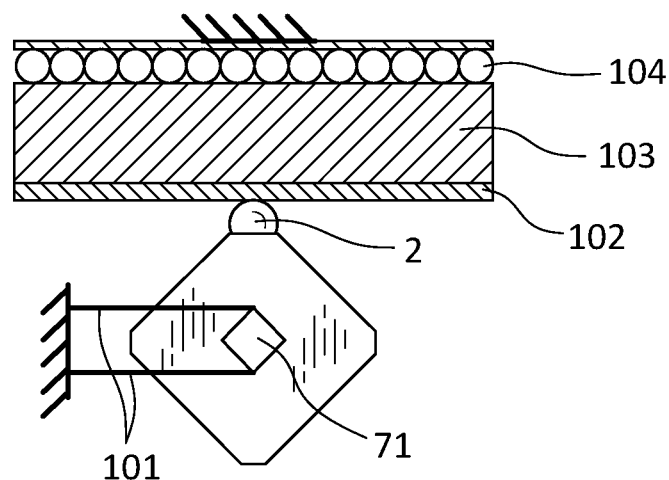
FIG. 15 illustrates a motor with an actuator according to an embodiment of the present invention.

Most of the embodiments of the actuator are combined with suspensions which have a large equivalent mechanical stiffness in the driving direction and at the same time a large mechanical compliance in the normal direction. Such a mechanism can be realized frictionless in several ways, for instance using flexible elements, e.g. flexure hinges and/or flexible plate material. Such a suspension 101 is schematically shown in FIG. 15.

In some preferred embodiments of the motor, parts of the suspension are made of a metallic material which can be very rigid in the driving direction. In other preferred embodiments, the suspension consists of a durable plastic material, as to enable injection molding of the part for large production quantities. The suspension may contain a composite, metallic and/or plastic parts, e.g. a reinforced plastic, for instance containing carbon or glass fibers.

Alternatively, a suspension can be used to connect the actuator of some embodiments of the invention to the environment, comprising a contact between the motor and an external bearing face. This contact is typically made of a low-friction material such as PTFE and the preload of motor against the slider is typically achieved through a mechanical spring (e.g. a mechanical leaf spring or a helicoidal spring) at the back of the motor. Also other types of bearing systems can be used for this.

An actuator according to embodiments of the invention can be mounted on a guiding system which helps to exert a constant normal force of a motor, according to embodiments of the invention, towards a driven part 13a, 13b. This is for instance illustrated in FIG. 15, showing a motor comprising a suspension 101 and a stage with a type of bearings 104. Furthermore, said motor is positioned such that a contact point 2 of the motor, makes contact with a, preferably ceramic, contact strip 102. The guiding system 101 is designed such that the contact point 2 is positioned substantially perpendicular to the preferably ceramic contact strip 102. The ceramic contact strip 102 can then be attached to a linear positioning rod 103.

In preferred embodiments a motor may be linked to a machine frame or slider by means of a flexible suspension, which preferably is rigid in the driving direction and flexible in the direction normal to the drive face, and which provides a preload for the motor against the opposing member of the drive pair. The preload mechanism can be integrated in the suspension or be external. In preferred embodiments the preload force can be applied by a mechanical spring (e.g. a mechanical leaf spring or a helicoidal spring), but this can also be achieved through an actuator producing an electrostatic, magnetic, piezoelectric, etc. force. With an active preload mechanism the preload force can be altered automatically after the installation of the motor. It is also possible to control the preload actively using a DC offset voltage on one of the electrodes.

The suspension preferably keeps the preload to a substantially constant value, because variations in the preload will lead to variations in the performance of the actuator or motor. However, sometimes it is interesting to actively control the preload in order to achieve a better performance.

A piezo motor according to embodiments of the invention, can alternatively be mounted on a moving part, while being in contact with a ceramic ruler 102 that is essentially standing still. For obtaining the same stroke, this will reduce the space required.

In several preferred embodiment all materials of the motor, including actuator, suspension, mounting rod . . . , according to the present invention, are preferentially non-magnetic and thus have no or only a negligible influence on the presence of magnetic fields, leaving the fields undisturbed. This is for instance required when electron or other beams are present.

In other preferred embodiments all materials of the motor are vacuum compatible.

Embodiments of a motor according to the present invention, can be used in several applications. For instance in automated handheld devices or for stages for microscopy machines, Scanning Electron Microscopy (SEM), wafer steppers, MRI and X-ray applications. Often embodiments of the present invention can be used in challenging environments: i.e. vacuum and non-magnetic environments.

It is an advantage of the invention that embodiments of the motor have at least two modes of operation: (1) resonant mode and (2) direct mode. As a result embodiments of the invention provide a multi mode motor.

(1) Resonant Mode:

In the resonant mode, an actuator according to embodiments of the invention is brought into resonance by driving the electrodes with high-frequency signals of specific amplitude and phase. The resonant mode is excited by energizing the electrodes with at least two signals and most of the times the amount of signals equals two. For some embodiments, only one signal can be used to energize the electrode(s), having two frequencies to excite the resonant modes at different eigenfrequencies, but in this case there is no phase variation possible. Preferably the high-frequency signals comprise a varying amplitude and/or phase. The phase difference, a first parameter, between the electrical signals may be adjusted, whereas in other control methods the voltage amplitude(s), either individually or together, of the sine wave signals may be adjusted. To acquire the advantage of both methods, phase control is implemented for low velocity and small stepping sizes and then the driving algorithm moves to amplitude control when high velocity is desired. Adjusting the phase and/or amplitude(s) of the high-frequency signals, results in the tip of the actuator to follow repeatedly a closed trajectory, for instance an ellipse. By varying the phase difference between the signals and their amplitude(s), the shape and size of said trajectory can be changed, as well as the direction in which the trajectory is followed, for instance clockwise or anti-clockwise for an ellipse. When said tip is pushed against a surface, this surface is driven relative to the actuator, with speed and sense depending on the chosen trajectory. The resonant mode is the fastest mode of both modes of operation, and gives unlimited stroke. However, it is the most energy consuming mode of both potentially overheating the actuators. It is also the most wear intensive mode of both (2) Direct Mode:

In direct mode some of the electrodes are driven in opposite direction, causing a bending of the actuator, resulting in a translation of the contact point parallel to the drive surface, and moving the load with it. In this mode, the speed is kept low and the contact does not slip, implying high accuracy but limited stroke. For instance, to enable a direct drive mode the one or more electrode(s) can be driven by one or more independent (quasi-)static voltage(s), which results in microscopic displacement with nanometer (or even better) resolution, over a small stroke.

The above discussed modes can, according to embodiments of the invention, be combined, serially in time, or in parallel. Combining serially in time is an easy way of combining the fast resonant mode to move fast to the desired position but with low accuracy, and then correcting the remaining position error using the direct operation mode. By superimposing the high-frequency signals of the resonant mode with low-frequency signals of the direct mode, the tracking error can be reduced.

In some embodiments the actuators are piezoactuators and these can be driven based on charge instead of voltage. The amplifiers required for this are termed charge amplifiers. This leads to a more linear displacement behavior of the piezoactuators.

The different actuator embodiments can be used for both drive and bearing functions. At least three actuators, e.g. piezoactuators, are preferably fixed to a common body, referred to as table, and with their contact zones, e.g. points 2 oriented towards a common ceramic disc or strip 102. These contact points are pressed against the drive plane by the mass of the system and/or additional preload systems pulling or pushing the table body towards the drive plane. The tip motions in the drive plane are used to drive the table with respect to the drive plane.

Various modifications and variations of the forming process described within embodiments of this invention are possible, which can be made without departing from the scope or spirit of the invention. Other embodiments will be apparent to those skilled in the practice of the invention, and the illustration, examples and specifications described herein can be considered as exemplary only.

It is to be understood that this invention is not limited to the particular features of the means and/or the process steps of the methods described as such means and methods may vary. It is also to be understood that the terminology used herein is for purposes of describing particular embodiments only, and is not intended to be limiting. It must be noted that, as used in the specification and the appended claims, the singular forms "a" "an" and "the" include singular and/or plural referents unless the context clearly dictates otherwise. It is also to be understood that plural forms include singular and/or plural referents unless the context clearly dictates otherwise. It is moreover to be understood that, in case parameter ranges are given which are delimited by numeric values, the ranges are deemed to include these limitation values.

The invention claimed is:

1. A piezo actuator comprising:
   a piezo material having
   a top surface,
   a bottom surface, and
   a circumference surface,
   the piezo material having a polarity and the piezo material comprising one or more mounting holes in the piezo material, the one or more mounting holes being positioned substantially central in at least the top surface or the bottom surface of the piezo material,
   at least one contact point for contacting a load to be actuated, the at least one contact point being positioned on the circumference surface of the piezo material, and
   a set of electrodes being positioned on the top surface of the piezo material and at least one electrode being positioned at the bottom surface of the piezo material;
   wherein the electrodes are electrically connected and configured such that, taking into account the polarity of the piezo material, driving of the electrodes induces an in-plane bending mode and/or an in-plane expansion mode, wherein the in-plane bending mode is an oscillation mode wherein adjacent corners move in opposite sense and wherein the in-plane expansion mode is an oscillation mode wherein different corners of the top surface move in a same direction being synchronously outward or inward.

2. The piezo actuator according to claim 1, wherein the electrodes are electrically connected and configured such that, taking into account the polarity of the piezo material, the driving of the electrodes induces alternatingly the in-plane bending mode and the in-plane expansion mode.

3. The piezo actuator according to claim 1, wherein the set of electrodes being positioned on the top surface of the piezo material comprises four electrodes, the four electrodes being paired two by two and the paired electrodes being positioned diametrically opposite with respect to the one or more mounting holes.

4. The piezo actuator according to claim 1, wherein the paired electrodes are configured such that they are energized two by two, symmetrically opposite to each other with respect to a center of a motor.

5. The piezo actuator according to claim 1, wherein the at least one electrode positioned at the bottom surface is used as a reference electrode.

6. The piezo actuator according to claim 1, wherein the piezo actuator comprises four electrodes at the top surface and four electrodes at the bottom surface, the four electrodes at the bottom surface each covering substantially a same area as their corresponding electrode at the top surface, and
wherein corresponding electrodes are electrically connected and configured such that corresponding electrodes are polarized inversely.

7. The piezo actuator according to claim 1, wherein the one or more central mounting holes are positioned in a knot of excited or excitable vibration modes.

8. The piezo actuator according to claim 1, wherein the one or more mounting holes have a non-circular cross-section.

9. The piezo actuator according to claim 1, wherein the at least one contact point is positioned at a corner edge of the circumference surface and/or wherein the piezo actuator has a substantially quadrangular shape.

10. The piezo actuator according to claim 1, wherein the piezo actuator material comprises a balancing mass integrated in the piezo actuator material.

11. The piezo actuator according to claim 1, wherein the piezo actuator is a piezo actuator plate having an average dimension in the plane with respect to thickness ratio larger than 1, for example larger than 2 to 1.

12. A motor for actuating a load, the motor comprising the piezo actuator according to claim 1.

13. The motor according to claim 12, wherein the piezo actuator is mounted using at least one mounting bar mounted in the at least one mounting hole.

14. The motor according to claim 13, wherein the at least one mounting bar is obtained by a bar having at least one slit along at least part of its length as well as an insertable element in the at least one slit and pushing, when positioned in the slit, different parts of the at least one mounting bar radially outward.

15. The motor according to claim 12, wherein the motor comprises a stack of piezo actuators for driving the same load, the stack of piezo actuators being stacked on top of each other.

16. The motor according to claim 12, the motor furthermore comprising a driver for providing driving signals to the electrodes of the piezo actuator wherein the driver and the piezo actuator material are adapted for inducing in the piezo actuator material an in-plane bending mode and/or an in-plane expansion mode.

* * * * *